(12) United States Patent
Dudar et al.

(10) Patent No.: US 9,145,051 B2
(45) Date of Patent: Sep. 29, 2015

(54) SYSTEMS AND METHODS FOR MANAGING BLEED EMISSIONS IN PLUG-IN HYBRID ELECTRIC VEHICLES

(71) Applicant: Ford Global Technologies, LLC, Dearborn, MI (US)

(72) Inventors: Aed M. Dudar, Canton, MI (US); Dennis Seung-Man Yang, Canton, MI (US); Russell Randall Pearce, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 136 days.

(21) Appl. No.: 14/101,168

(22) Filed: Dec. 9, 2013

(65) Prior Publication Data

US 2015/0158378 A1    Jun. 11, 2015

(51) Int. Cl.
*B60K 15/03* (2006.01)
*B60K 15/035* (2006.01)

(52) U.S. Cl.
CPC ........... *B60K 15/03* (2013.01); *B60K 15/03519* (2013.01); *B60K 2015/0319* (2013.01); *B60K 2015/03427* (2013.01); *Y10S 903/904* (2013.01)

(58) Field of Classification Search
CPC ............. B60K 15/03; B60K 15/03519; B60K 2015/0319; B60K 2015/03427; Y10S 903/904
USPC .......................................... 701/22
See application file for complete search history.

(56) References Cited

U.S. PATENT DOCUMENTS

| | | | |
|---|---|---|---|
| 4,919,103 A | 4/1990 | Ishiguro et al. | |
| 5,861,050 A | 1/1999 | Pittel et al. | |
| 6,189,515 B1 | 2/2001 | Jamrog et al. | |
| 6,689,196 B2 | 2/2004 | Amano et al. | |
| 6,892,711 B2 | 5/2005 | Belanger, Jr. et al. | |
| 7,922,797 B2 | 4/2011 | Kosugi et al. | |
| 7,999,664 B2 | 8/2011 | Barajas | |
| 8,534,400 B2 | 9/2013 | Stanek et al. | |
| 9,050,885 B1 * | 6/2015 | Dudar et al. ......................... | 1/1 |
| 2009/0084363 A1 | 4/2009 | Reddy | |

(Continued)

FOREIGN PATENT DOCUMENTS

WO    2006041400 A1    4/2006

OTHER PUBLICATIONS

Dudar, Aed M. et al., "Systems and Methods for Managing Bleed Emissions in Plug-In Hybrid Electric Vehicles," U.S. Appl. No. 14/101,113, filed Dec. 9, 2013, 56 pages.

(Continued)

*Primary Examiner* — Richard Camby
(74) *Attorney, Agent, or Firm* — James Dottavio; Alleman Hall McCoy Russell & Tuttle LLP

(57) ABSTRACT

A method for a plug-in hybrid electric vehicle, comprising: during a first condition, including an engine-off condition and the plug-in hybrid electric vehicle coupled to an external power source; heating a fuel vapor canister based on a fuel tank vacuum; and opening a fuel tank isolation valve to draw heated vapors into a fuel tank. In this way, a passive purge operation may be executed, thereby purging the fuel vapor canister without forcing the engine to turn on. Thus, the vehicle may be operated at peak fuel economy without increasing emissions.

20 Claims, 9 Drawing Sheets

(56) References Cited

U.S. PATENT DOCUMENTS

| | | |
|---|---|---|
| 2010/0094493 A1 | 4/2010 | Atsumi |
| 2011/0093305 A1 | 4/2011 | Alexander et al. |
| 2011/0297127 A1 | 12/2011 | Aso |
| 2014/0324284 A1* | 10/2014 | Glinsky et al. ............... 701/34.4 |

OTHER PUBLICATIONS

Chambon, Paul, "PHEV Cold Start Emissions Management," SAE International Paper Series 2013-01-0358, SAE Int. J. Alt. Power, vol. 6, Issue 2, Jul. 2013, 9 pages.

* cited by examiner

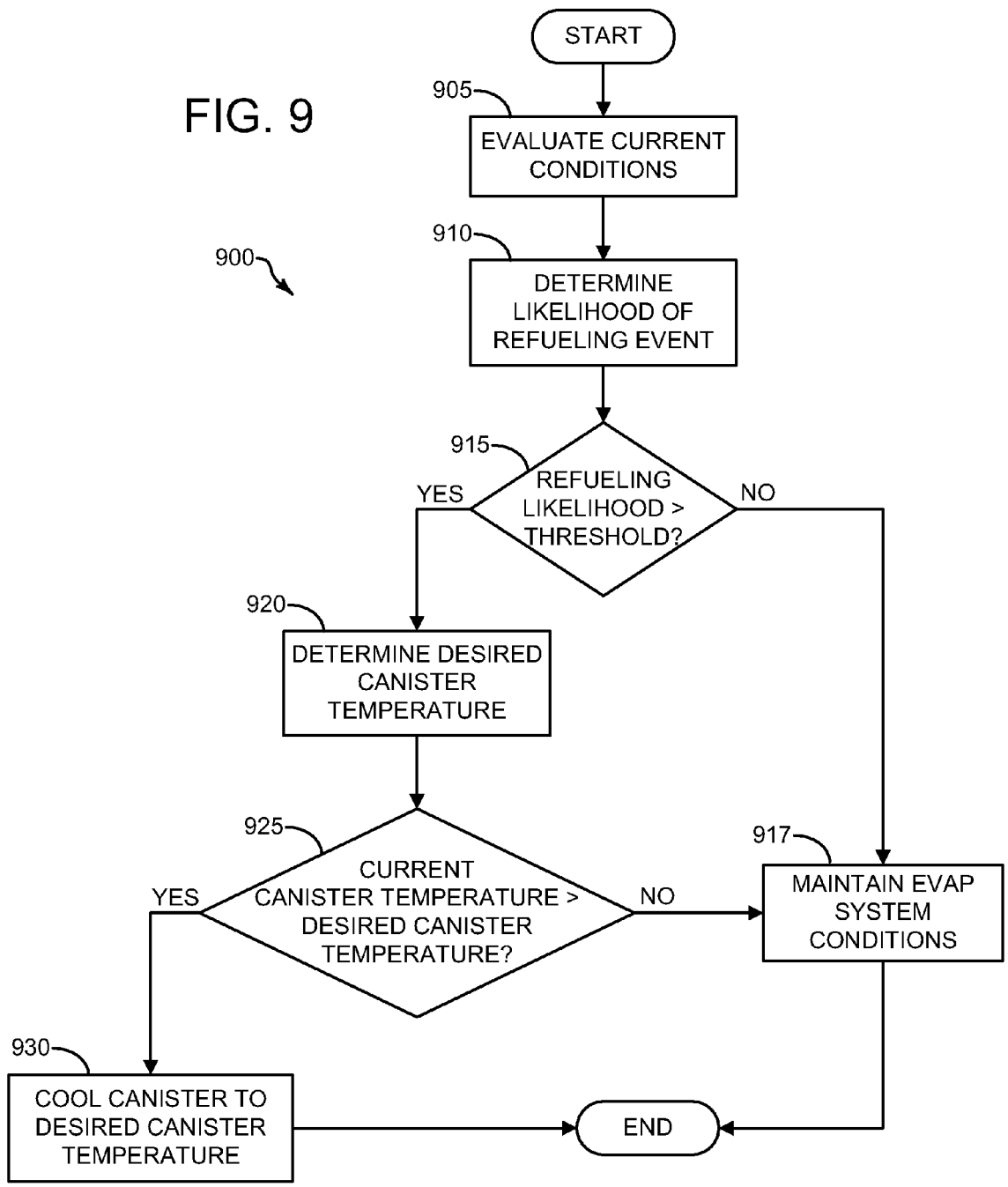

SYSTEMS AND METHODS FOR MANAGING BLEED EMISSIONS IN PLUG-IN HYBRID ELECTRIC VEHICLES

BACKGROUND AND SUMMARY

Vehicle emission control systems may be configured to store fuel vapors from fuel tank refueling and diurnal engine operations in a fuel vapor canister, and then purge the stored vapors during a subsequent engine operation. The stored vapors may be routed to engine intake for combustion, further improving fuel economy.

In a typical canister purge operation, a canister purge valve coupled between the engine intake and the fuel canister is opened, allowing for intake manifold vacuum to be applied to the fuel canister. Simultaneously, a canister vent valve coupled between the fuel canister and atmosphere is opened, allowing for fresh air to enter the canister. This configuration facilitates desorption of stored fuel vapors from the adsorbent material in the canister, regenerating the adsorbent material for further fuel vapor adsorption.

However, engine run time in PHEVs may be limited, and thus opportunities for purging fuel vapor from the canister may also be limited. It may be possible to force the engine on to allow for a purging operation, but this would decrease the overall fuel economy of the vehicle. Further, if the vehicle is parked during a portion of the diurnal cycle in which the ambient temperature is increasing, the fuel tank may undergo a pressure rise, forcing hydrocarbons out of the canister and into the atmosphere. This could potentially result in the vehicle failing emissions testing, and potentially losing classification as a practically zero emissions vehicle (PZEV).

The inventors herein have recognized the above limitations and have developed systems and methods to at least partially address these problems. In one example, a method for a plug-in hybrid electric vehicle, comprising: during a first condition, including an engine-off condition and the plug-in hybrid electric vehicle coupled to an external power source; heating a fuel vapor canister based on a fuel tank vacuum; and opening a fuel tank isolation valve to draw heated vapors into a fuel tank. In this way, a passive purge operation may be executed, thereby purging the fuel vapor canister without forcing the engine to turn on. Thus, the vehicle may be operated at peak fuel economy without increasing emissions.

In another example, a system for a plug-in hybrid electric vehicle, comprising: a fuel vapor canister coupled to a fuel tank via a fuel tank isolation valve and further coupled to atmosphere via a canister vent valve; a fuel tank pressure sensor coupled to the fuel tank; a heating element coupled to the fuel vapor canister; and a control system including executable instructions stored in non-transitory memory for: during a first condition, including an engine-off condition and the plug-in hybrid electric vehicle coupled to an external power source; heating the fuel vapor canister based on a fuel tank vacuum; opening the canister vent valve to draw atmosphere into the fuel vapor canister; and opening a fuel tank isolation valve to draw heated vapors into a fuel tank. In this way, diurnal emissions for a PHEV may be decreased. By cleaning the fuel canister of fuel vapor, there may be decreased risk of hydrocarbons bleeding out of the canister and into the atmosphere as ambient temperature decreases.

In yet another example, A method for a plug-in hybrid electric vehicle, comprising: during a first condition, including an engine-off condition, the plug-in hybrid electric vehicle coupled to an external power source, a fuel vapor canister load above a threshold, a fuel tank vacuum above a threshold, and a first ambient temperature below a threshold; heating a fuel vapor canister using power from the external power source; then opening a canister vent valve; then opening a fuel tank isolation valve. In this way, canister load may be managed without increasing the load on the PHEV battery. The external power source (e.g. a power grid) may be used to heat the fuel vapor canister in preparation for a passive purge operation.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 9 shows a high-level flow chart for a method of cooling a fuel vapor canister in anticipation of a refueling event.

DETAILED DESCRIPTION

Figure 7:
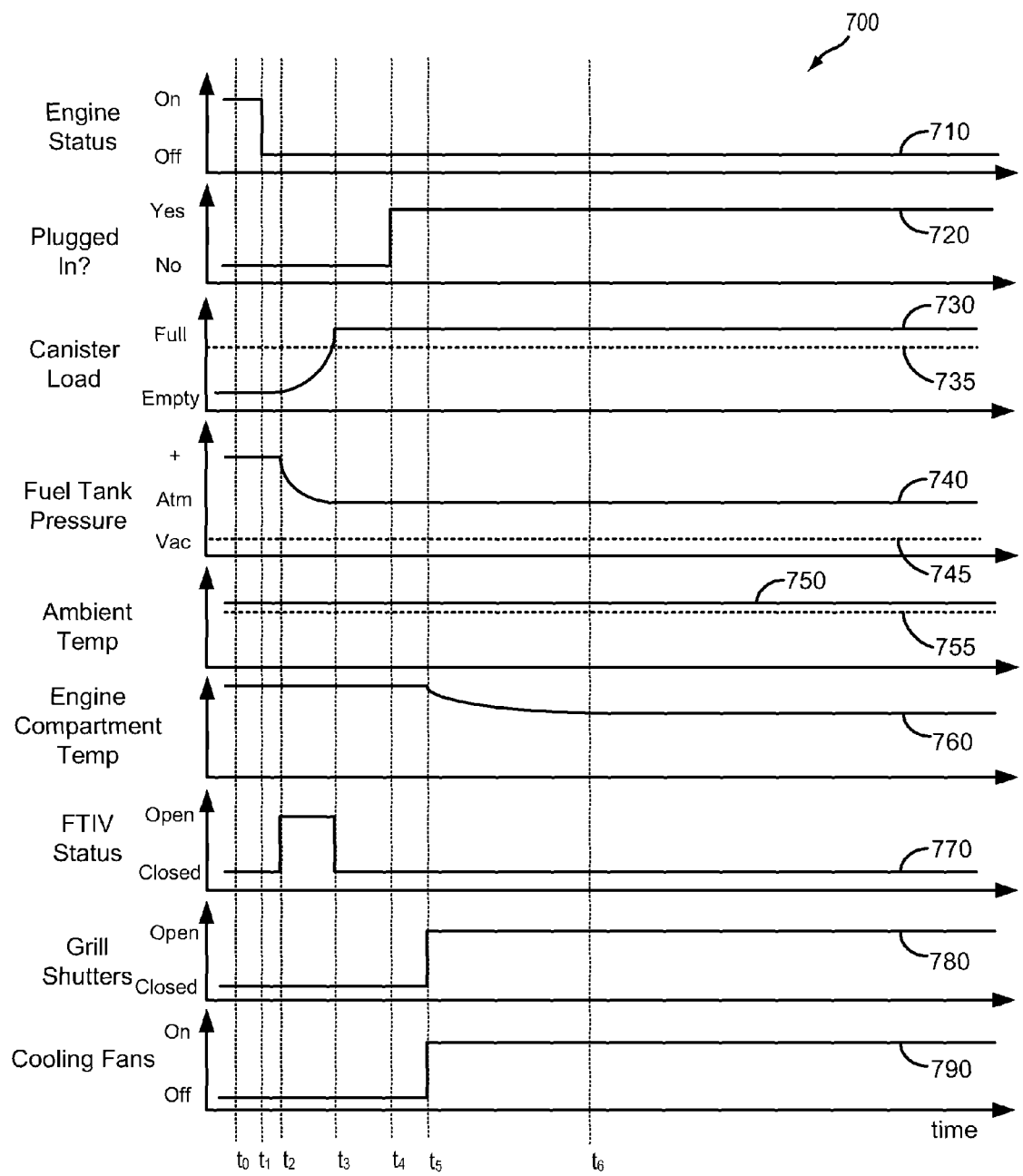
FIG. 7 shows a timeline for cooling a fuel vapor canister in accordance with the present disclosure.
Figure 8:
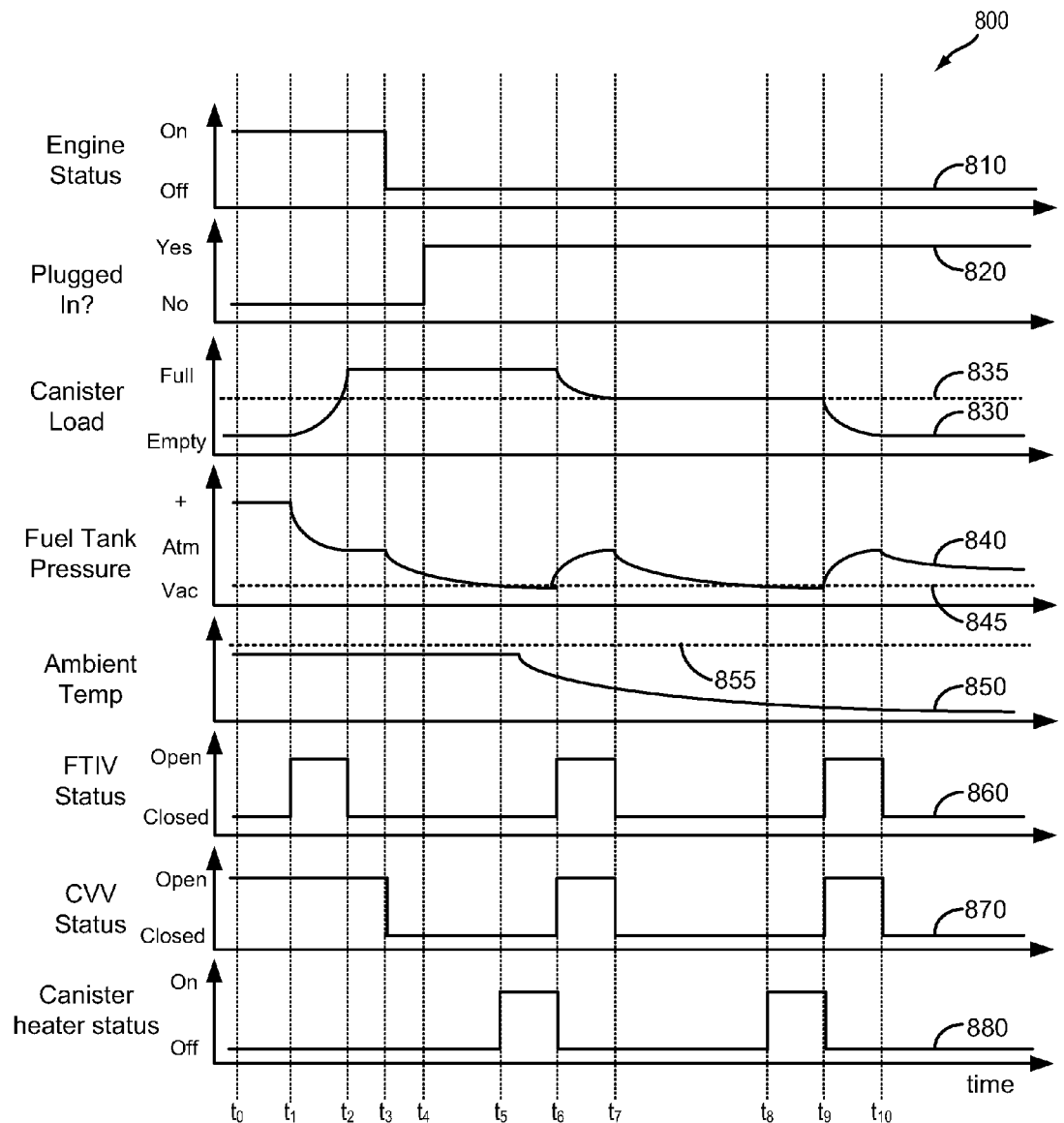
FIG. 8 shows a timeline for passively purging a fuel vapor canister in accordance with the present disclosure.

This description relates to systems and methods for managing bleed emissions in a plug-in electric hybrid vehicle. The vehicle may include a fuel system and an evaporative emissions system coupled to an engine, such as the system depicted in FIG. 1. The hybrid vehicle system may include a cooling system, such as the cooling system depicted in FIG. 2, and may further include an air-conditioning system, such as the air conditioning system depicted in FIG. 3. A controller or power train control module (PCM) may be configured to perform a control routine for bleed emissions management, such as the method depicted in FIG. 4. Under a set of predetermined conditions including an engine off condition and a vehicle plugged-in condition, the bleed emissions management routine may include a canister cooling operation, such as the method depicted in FIG. 5. Under a different set of predetermined conditions including an engine off condition and a vehicle plugged-in condition, the bleed emissions management routine may include a passive purge operation, such as the method depicted in FIG. 6. Examples of emissions control routines are shown in FIGS. 7 and 8. In this way, bleed emissions may be reduced without sacrificing battery power.

Figure 1:
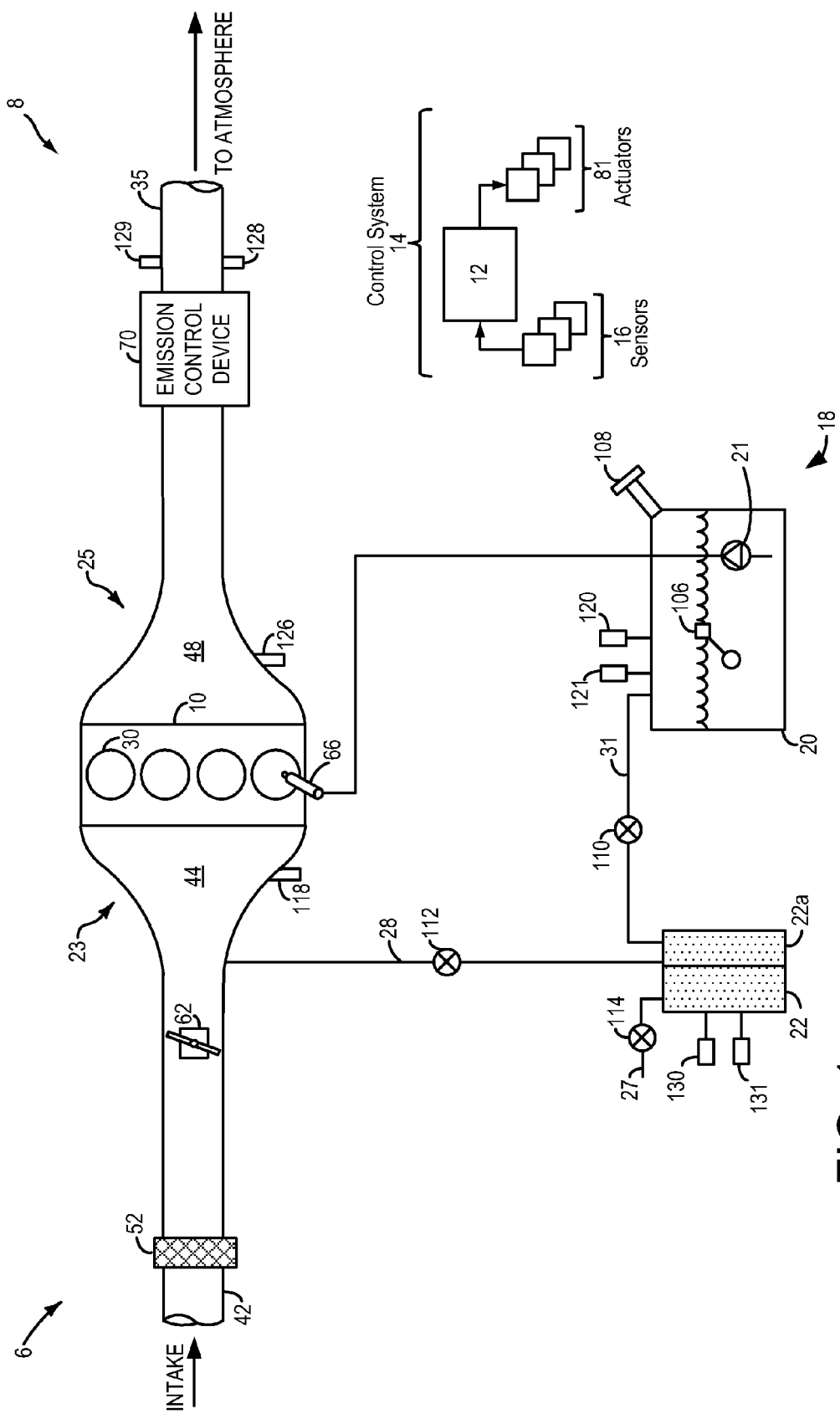
FIG. 1 shows a schematic depiction of a fuel system coupled to an engine system.
Figure 2:
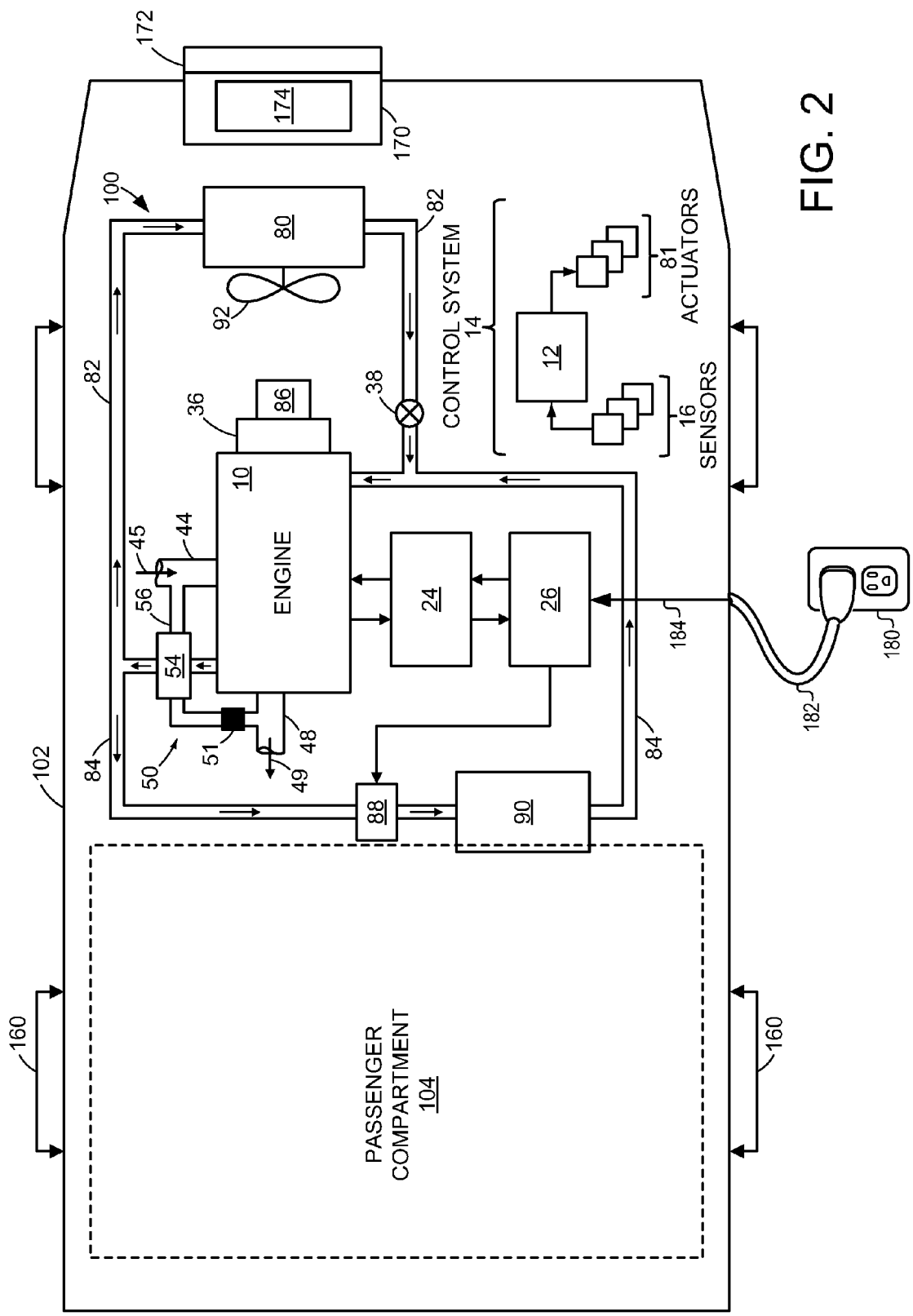
FIG. 2 shows a schematic depiction of a cooling system for a hybrid vehicle system.

FIG. 1 shows a schematic depiction of a hybrid vehicle system 102 that can derive propulsion power from engine system 8 and/or an on-board energy storage device, such as a battery system (see FIG. 2 for a schematic depiction). An energy conversion device, such as a generator (not shown), may be operated to absorb energy from vehicle motion and/or engine operation, and then convert the absorbed energy to an energy form suitable for storage by the energy storage device.

Engine system 8 may include an engine 10 having a plurality of cylinders 30. Engine 10 includes an engine intake 23 and an engine exhaust 25. Engine intake 23 includes an air intake throttle 62 fluidly coupled to the engine intake manifold 44 via an intake passage 42. Air may enter intake passage 42 via air filter 52. Engine exhaust 25 includes an exhaust manifold 48 leading to an exhaust passage 35 that routes exhaust gas to the atmosphere. Engine exhaust 25 may include one or more emission control devices 70 mounted in a close-coupled position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 8 is a boosted engine system, the engine system may further include a boosting device, such as a turbocharger (not shown).

Engine system 8 is coupled to a fuel system 18. Fuel system 18 includes a fuel tank 20 coupled to a fuel pump 21 and a fuel vapor canister 22. During a fuel tank refueling event, fuel may be pumped into the vehicle from an external source through refueling port 108. Fuel tank 20 may hold a plurality of fuel blends, including fuel with a range of alcohol concentrations, such as various gasoline-ethanol blends, including E10, E85, gasoline, etc., and combinations thereof. A fuel level sensor 106 located in fuel tank 20 may provide an indication of the fuel level ("Fuel Level Input") to controller 12. As depicted, fuel level sensor 106 may comprise a float connected to a variable resistor. Alternatively, other types of fuel level sensors may be used.

Fuel pump 21 is configured to pressurize fuel delivered to the injectors of engine 10, such as example injector 66. While only a single injector 66 is shown, additional injectors are provided for each cylinder. It will be appreciated that fuel system 18 may be a return-less fuel system, a return fuel system, or various other types of fuel system. Vapors generated in fuel tank 20 may be routed to fuel vapor canister 22, via conduit 31, before being purged to the engine intake 23.

Fuel vapor canister 22 is filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in fuel vapor canister 22 may be purged to engine intake 23 by opening canister purge valve 112. While a single canister 22 is shown, it will be appreciated that fuel system 18 may include any number of canisters. In one example, canister purge valve 112 may be a solenoid valve wherein opening or closing of the valve is performed via actuation of a canister purge solenoid.

Canister 22 may include a buffer 22a (or buffer region), each of the canister and the buffer comprising the adsorbent. As shown, the volume of buffer 22a may be smaller than (e.g., a fraction of) the volume of canister 22. The adsorbent in the buffer 22a may be same as, or different from, the adsorbent in the canister (e.g., both may include charcoal). Buffer 22a may be positioned within canister 22 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine.

Canister 22 includes a vent 27 for routing gases out of the canister 22 to the atmosphere when storing, or trapping, fuel vapors from fuel tank 20. Vent 27 may also allow fresh air to be drawn into fuel vapor canister 22 when purging stored fuel vapors to engine intake 23 via purge line 28 and purge valve 112. While this example shows vent 27 communicating with fresh, unheated air, various modifications may also be used. Vent 27 may include a canister vent valve 114 to adjust a flow of air and vapors between canister 22 and the atmosphere. The canister vent valve may also be used for diagnostic routines. When included, the vent valve may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister. In one example, canister vent valve 114 may be a solenoid valve wherein opening or closing of the valve is performed via actuation of a canister vent solenoid. In particular, the canister vent valve may be an open that is closed upon actuation of the canister vent solenoid.

As such, hybrid vehicle system 102 may have reduced engine operation times due to the vehicle being powered by engine system 8 during some conditions, and by the energy storage device under other conditions. While the reduced engine operation times reduce overall carbon emissions from the vehicle, they may also lead to insufficient purging of fuel vapors from the vehicle's emission control system. To address this, a fuel tank isolation valve 110 may be optionally included in conduit 31 such that fuel tank 20 is coupled to canister 22 via the valve. During regular engine operation, isolation valve 110 may be kept closed to limit the amount of diurnal or "running loss" vapors directed to canister 22 from fuel tank 20. During refueling operations, and selected purging conditions, isolation valve 110 may be temporarily opened, e.g., for a duration, to direct fuel vapors from the fuel tank 20 to canister 22. By opening the valve during purging conditions when the fuel tank pressure is higher than a threshold (e.g., above a mechanical pressure limit of the fuel tank above which the fuel tank and other fuel system components may incur mechanical damage), the refueling vapors may be released into the canister and the fuel tank pressure may be maintained below pressure limits. While the depicted example shows isolation valve 110 positioned along conduit 31, in alternate embodiments, the isolation valve may be mounted on fuel tank 20.

One or more pressure sensors 120 may be coupled to fuel system 18 for providing an estimate of a fuel system pressure. In one example, the fuel system pressure is a fuel tank pressure, wherein pressure sensor 120 is a fuel tank pressure sensor coupled to fuel tank 20 for estimating a fuel tank pressure or vacuum level. While the depicted example shows pressure sensor 120 directly coupled to fuel tank 20, in alternate embodiments, the pressure sensor may be coupled between the fuel tank and canister 22, specifically between the fuel tank and isolation valve 110. In still other embodiments, a first pressure sensor may be positioned upstream of the isolation valve (between the isolation valve and the canister) while a second pressure sensor is positioned downstream of the isolation valve (between the isolation valve and the fuel tank), to provide an estimate of a pressure difference across the valve. In some examples, a vehicle control system may infer and indicate a fuel system leak based on changes in a fuel tank pressure during a leak diagnostic routine.

One or more temperature sensors 121 may also be coupled to fuel system 18 for providing an estimate of a fuel system temperature. In one example, the fuel system temperature is a fuel tank temperature, wherein temperature sensor 121 is a fuel tank temperature sensor coupled to fuel tank 20 for estimating a fuel tank temperature. While the depicted example shows temperature sensor 121 directly coupled to fuel tank 20, in alternate embodiments, the temperature sensor may be coupled between the fuel tank and canister 22.

Fuel vapors released from canister 22, for example during a purging operation, may be directed into engine intake manifold 44 via purge line 28. The flow of vapors along purge line 28 may be regulated by canister purge valve 112, coupled between the fuel vapor canister and the engine intake. The quantity and rate of vapors released by the canister purge valve may be determined by the duty cycle of an associated canister purge valve solenoid (not shown). As such, the duty cycle of the canister purge valve solenoid may be determined by the vehicle's powertrain control module (PCM), such as controller 12, responsive to engine operating conditions, including, for example, engine speed-load conditions, an air-fuel ratio, a canister load, etc. By commanding the canister purge valve to be closed, the controller may seal the fuel vapor recovery system from the engine intake. An optional canister check valve (not shown) may be included in purge line 28 to prevent intake manifold pressure from flowing gases in the opposite direction of the purge flow. As such, the check valve may be necessary if the canister purge valve control is not accurately timed or the canister purge valve itself can be forced open by a high intake manifold pressure. An estimate of the manifold absolute pressure (MAP) or manifold vacuum (ManVac) may be obtained from MAP sensor 118 coupled to intake manifold 44, and communicated with controller 12. Alternatively, MAP may be inferred from alternate engine operating conditions, such as mass air flow (MAF), as measured by a MAF sensor (not shown) coupled to the intake manifold.

Fuel system 18 may be operated by controller 12 in a plurality of modes by selective adjustment of the various valves and solenoids. For example, the fuel system may be operated in a fuel vapor storage mode (e.g., during a fuel tank refueling operation and with the engine not running), wherein the controller 12 may open isolation valve 110 and canister vent valve 114 while closing canister purge valve (CPV) 112 to direct refueling vapors into canister 22 while preventing fuel vapors from being directed into the intake manifold.

As another example, the fuel system may be operated in a refueling mode (e.g., when fuel tank refueling is requested by a vehicle operator), wherein the controller 12 may open isolation valve 110 and canister vent valve 114, while maintaining canister purge valve 112 closed, to depressurize the fuel tank before allowing enabling fuel to be added therein. As such, isolation valve 110 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 12 may open canister purge valve 112 and canister vent valve while closing isolation valve 110. Herein, the vacuum generated by the intake manifold of the operating engine may be used to draw fresh air through vent 27 and through fuel vapor canister 22 to purge the stored fuel vapors into intake manifold 44. In this mode, the purged fuel vapors from the canister are combusted in the engine. The purging may be continued until the stored fuel vapor amount in the canister is below a threshold. During purging, the learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel vapor canister. For example, one or more oxygen sensors (not shown) may be coupled to the canister 22 (e.g., downstream of the canister), or positioned in the engine intake and/or engine exhaust, to provide an estimate of a canister load (that is, an amount of fuel vapors stored in the canister). Based on the canister load, and further based on engine operating conditions, such as engine speed-load conditions, a purge flow rate may be determined.

Fuel vapor adsorbing to the canister adsorbent is typically an exothermic reaction (heat is released). Similarly, fuel vapor desorbing from the canister adsorbent is typically an endothermic reaction (heat is absorbed). As such, one or more temperature sensors 130 may be coupled to canister 22 (and/or buffer 22a). Temperature sensor 130 may be used, for example, to monitor the canister temperature during refueling operations, so as to infer canister load, and may be further used, for example, to monitor the canister temperature during purging operations, so as to infer fuel charge entering the engine intake. Further, canister 22 may be coupled to one or more heating elements 131. Heating element 131 may be used to selectively heat the canister (and the adsorbent contained within) for example, to increase desorption of fuel vapors prior to performing a purge operation. Heating element 131 may comprise an electric heating element, such as a conductive metal, ceramic, or carbon element that may be heated electrically, such as a thermistor. In some embodiments, heating element 131 may comprise a source of microwave energy, or may comprise a canister jacket coupled to a source of hot air or hot water. Heating element 131 may be coupled to one or more heat exchangers that may facilitate the transfer of heat, (e.g. from hot exhaust) to canister 22. Heating element 131 may be configured to heat air within canister 22, and/or to directly heat the adsorbent located within canister 22. In some embodiments, heating element 131 may be included in a heater compartment coupled to the interior or exterior of canister 22. As described further herein, and with regards to FIG. 2, canister 22 may be coupled to one or more cooling circuits, and/or cooling fans. In this way, canister 22 may be selectively cooled to increase adsorption of fuel vapors (e.g. prior to a refueling event). Example methods for heating and cooling canister 22 are described herein and with regards to FIGS. 3-5.

Vehicle system 102 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, temperature sensor 128, MAP sensor 118, pressure sensor 120, and pressure sensor 129. Other sensors such as additional pressure, temperature, air/fuel ratio, and composition sensors may be coupled to various locations in the vehicle system 102. As another example, the actuators may include fuel injector 66, isolation valve 110, purge valve 112, vent valve 114, fuel pump 21, and throttle 62.

Control system 14 may further receive information regarding the location of the vehicle from an on-board global positioning system (GPS). Information received from the GPS may include vehicle speed, vehicle altitude, vehicle position, etc. This information may be used to infer engine operating parameters, such as local barometric pressure. Control system 14 may further be configured to receive information via the internet or other communication networks. Information received from the GPS may be cross-referenced to information available via the internet to determine local weather conditions, local vehicle regulations, etc. Control system 14 may use the internet to obtain updated software modules which may be stored in non-transitory memory.

The control system 14 may include a controller 12. Controller 12 may be configured as a conventional microcomputer including a microprocessor unit, input/output ports, read-only memory, random access memory, keep alive memory, a controller area network (CAN) bus, etc. Controller 12 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines. Example control routines are described herein with regard to FIGS. 4-6.

Turning now to FIG. 2, an example embodiment of a cooling system 100 in a motor vehicle 102 is illustrated schematically. Cooling system 100 circulates coolant through internal combustion engine 10 and through exhaust gas recirculation (EGR) cooler 54 to absorb waste heat and distributes the heated coolant to radiator 80 and/or heater core 90 via coolant lines 82 and 84, respectively.

In particular, FIG. 2 shows cooling system 100 coupled to engine 10 and circulating engine coolant from engine 10, through EGR cooler 54, and to radiator 80 via engine-driven water pump 86, and back to engine 10 via coolant line 82. Engine-driven water pump 86 may be coupled to the engine via front end accessory drive (FEAD) 36, and rotated proportionally to engine speed via belt, chain, etc. Specifically, engine-driven pump 86 circulates coolant through passages in the engine block, head, etc., to absorb engine heat, which is then transferred via the radiator 80 to ambient air. In an example where pump 86 is a centrifugal pump, the pressure (and resulting flow) produced may be proportional to the crankshaft speed, which in the example of FIG. 1, is directly proportional to engine speed. The temperature of the coolant may be regulated by a thermostat valve 38, located in the cooling line 82, which may be kept closed until the coolant reaches a threshold temperature.

Further, fan 92 may be coupled to radiator 80 in order to maintain an airflow through radiator 80 when vehicle 102 is moving slowly or stopped while the engine is running. In some examples, fan speed may be controlled by controller 12. Alternatively, fan 92 may be coupled to engine-driven water pump 86.

As shown in FIG. 2, engine 10 may include an exhaust gas recirculation (EGR) system 50. EGR system 50 may route a desired portion of exhaust gas from exhaust manifold 48 to intake manifold 44 via EGR passage 56. The amount of EGR provided to intake manifold 44 may be varied by controller 12 via EGR valve 51. Further, an EGR sensor (not shown) may be arranged within EGR passage 56 and may provide an indication of one or more of pressure, temperature, and concentration of the exhaust gas. Alternatively, the EGR may be controlled based on an exhaust oxygen sensor and/or and intake oxygen sensor. Under some conditions, EGR system 50 may be used to regulate the temperature of the air and fuel mixture within the combustion chamber. EGR system 50 may further include EGR cooler 54 for cooling exhaust gas 49 being reintroduced to engine 10. In such an embodiment, coolant leaving engine 10 may be circulated through EGR cooler 54 before moving through coolant line 82 to radiator 80.

After passing through EGR cooler 54, coolant may flow through coolant line 82, as described above, and/or through coolant line 84 to heater core 90 where the heat may be transferred to passenger compartment 104, and the coolant flows back to engine 10. In some examples, engine-driven pump 86 may operate to circulate the coolant through both coolant lines 82 and 84. In other examples, such as the example of FIG. 2 in which vehicle 102 has a hybrid-electric propulsion system, an electric auxiliary pump 88 may be included in the cooling system in addition to the engine-driven pump. As such, auxiliary pump 88 may be employed to circulate coolant through heater core 90 during occasions when engine 10 is off (e.g., electric only operation) and/or to assist engine-driven pump 86 when the engine is running, as will be described in further detail below. Like engine-driven pump 86, auxiliary pump 88 may be a centrifugal pump; however, the pressure (and resulting flow) produced by pump 88 may be proportional to an amount of power supplied to the pump by energy storage device 26.

Motor vehicle 102 may further include a grill 172 providing an opening (e.g., a grill opening, a bumper opening, etc.) for receiving air flow through or near the front end of the vehicle and into the engine compartment. Such air flow may then be utilized by radiator 80 and other components to keep the engine and/or transmission cool. Further, the air flow may reject heat from the vehicle air conditioning and can improve performance of turbo charged/super charged engines that are equipped with intercoolers that reduce the temperature of the air that goes into the intake manifold/engine. Other under hood components (fuel system, batteries, fuel vapor canister, etc.) may benefit from the cooling air flow as well. Thus, grill shutter system 170 may assist cooling system 100 in cooling internal combustion engine 10. Grill shutter system 170 comprises one or more grill shutters 174 configured to adjust the amount of air flow received through grill 172.

Grill shutters 174 are operable between an opened position and a closed position, and may be maintained at either position or a plurality of intermediate positions thereof. In other words, opening of grill shutters 174 may be adjusted such that grill shutters 174 are opened partially, closed partially, or cycled between an opened position and a closed position to provide air flow for cooling engine compartment components at the least loss in fuel economy. This is because closing and/or partially closing grill shutters 174 reduces an amount of air flow received through grill 172, thus reducing the aerodynamic drag on the vehicle.

In some embodiments, control system 14 may be configured to adjust opening of grill shutters 174. Adjusting opening of grill shutters 174 may include opening one or more of the grill shutters, closing one or more of the grill shutters, partially opening one or more of the grill shutters, partially closing one or more of the grill shutters, adjusting opening and closing timing, etc. As an example, controller 12 may be communicably connected to grill shutter system 170, and may have instructions stored thereon to adjust opening of grill shutters 174.

Further, grill shutter system 170 may be adjusted during a non-driven vehicle condition. Thus, adjusting opening of one or more of the grill shutters 174 can be in response to a non-driven vehicle condition. The non-driven vehicle condition may be a deceleration condition, a braking condition, a tip-out condition, a combination thereof, or another type of condition signaling that a non-driven vehicle condition is occurring, or about to occur. For example, an automatic cruise control braking signal may also be used. Further still, global positioning signals may be used indicating a slower region ahead, a downgrade approaching, etc.

In this example embodiment, the hybrid propulsion system includes an energy conversion device 24, which may include a motor, a generator, among others and combinations thereof. The energy conversion device 24 is further shown coupled to an energy storage device 26, which may include a battery, a capacitor, a flywheel, a pressure vessel, etc. The energy conversion device may be operated to absorb energy from vehicle motion and/or the engine and convert the absorbed energy to an energy form suitable for storage by the energy storage device (e.g., provide a generator operation). The energy conversion device may also be operated to supply an output (power, work, torque, speed, etc.) to the drive wheels 160, engine 10 (e.g., provide a motor operation), auxiliary pump 88, etc. It should be appreciated that the energy conversion device may, in some embodiments, include only a motor, only a generator, or both a motor and generator, among various other components used for providing the appropriate conversion of energy between the energy storage device and the vehicle drive wheels and/or engine.

Hybrid-electric propulsion embodiments may include full hybrid systems, in which the vehicle can run on just the engine, just the energy conversion device (e.g., motor), or a combination of both. Assist or mild hybrid configurations may also be employed, in which the engine is the primary torque source, with the hybrid propulsion system acting to selectively deliver added torque, for example during tip-in or other conditions. Further still, starter/generator and/or smart alternator systems may also be used. Additionally, the various components described above may be controlled by vehicle controller 12 (described below).

From the above, it should be understood that the exemplary hybrid-electric propulsion system is capable of various modes of operation. In a full hybrid implementation, for example, the propulsion system may operate using energy conversion device 24 (e.g., an electric motor) as the only torque source propelling the vehicle. This "electric only" mode of operation may be employed during braking, low speeds, while stopped at traffic lights, etc. In another mode, engine 10 is turned on, and acts as the only torque source powering drive wheel 160. In still another mode, which may be referred to as an "assist" mode, the hybrid propulsion system may supplement and act in cooperation with the torque provided by engine 10. As indicated above, energy conversion device 24 may also operate in a generator mode, in which torque is absorbed from engine 10 and/or the transmission. Furthermore, energy conversion device 24 may act to augment or absorb torque during transitions of engine 10 between different combustion modes (e.g., during transitions between a spark ignition mode and a compression ignition mode).

Energy storage device 26 may periodically receive electrical energy from a power source 180 residing external to the vehicle (e.g. not part of the vehicle) as indicated by arrow 184.

As a non-limiting example, vehicle system 102 may be configured as a plug-in hybrid electric vehicle (PHEV), whereby electrical energy may be supplied to energy storage device 26 from power source 180 via an electrical energy transmission cable 182. During a recharging operation of energy storage device 26 from power source 180, electrical transmission cable 182 may electrically couple energy storage device 26 and power source 180. While the vehicle propulsion system is operated to propel the vehicle, electrical transmission cable 182 may disconnected between power source 180 and energy storage device 26. Control system 14 may identify and/or control the amount of electrical energy stored at the energy storage device, which may be referred to as the state of charge (SOC). Power source 180 may comprise a part of an electrical grid.

In other embodiments, electrical transmission cable 182 may be omitted, where electrical energy may be received wirelessly at energy storage device 26 from power source 180. For example, energy storage device 26 may receive electrical energy from power source 180 via one or more of electromagnetic induction, radio waves, and electromagnetic resonance. As such, it should be appreciated that any suitable approach may be used for recharging energy storage device 26 from a power source that does not comprise part of the vehicle. In this way, a motor may propel the vehicle by utilizing an energy source other than the fuel utilized by engine 10.

Figure 3:
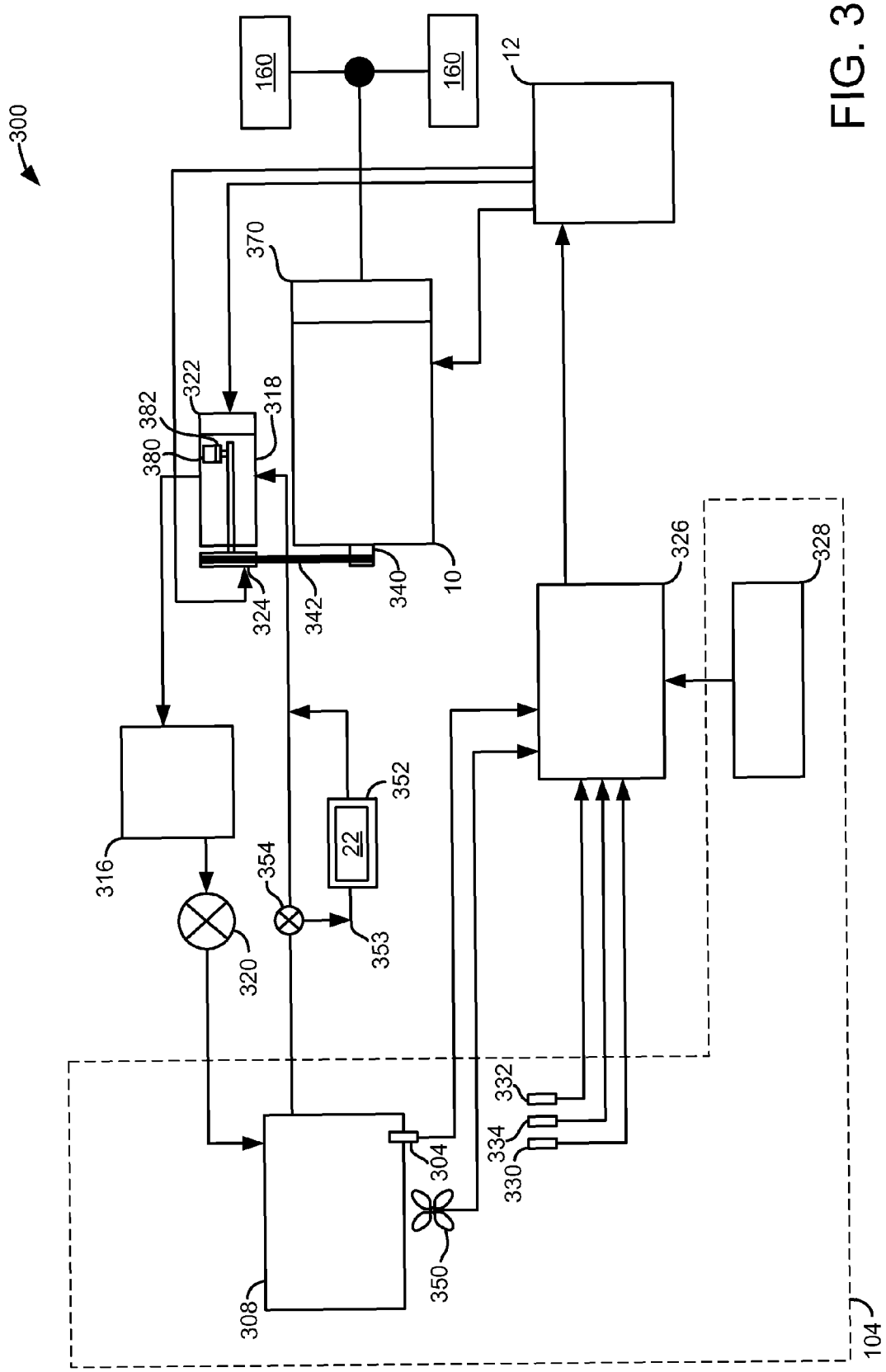
FIG. 3 shows a schematic depiction of an example air conditioning system for a hybrid vehicle system.

In some embodiments, vehicle system 102 may include an air-conditioning system. FIG. 3 schematically shows an example air conditioning system 300 that may be included in vehicle system 102, although it should be understood that numerous other conformations are possible without departing from the scope of this disclosure. Air conditioning system 300 includes an evaporator 308 for cooling vehicle cabin air. Air is passed over evaporator 308 via fan 350 and directed around passenger compartment 104. Climate controller 326 operates fan 350 according to operator settings as well as climate sensors. Temperature sensor 304 provides an indication of the temperature of evaporator 308 to climate controller 326. Cabin temperature sensor 330 provides an indication of cabin temperature to climate controller 326. Similarly, humidity sensor 332 provides climate controller 326 an indication of cabin humidity. Sun load sensor 334 provides an indication of cabin heating from sun light to climate controller 326. Climate controller also receives operator inputs from operator interface 328 and supplies desired evaporator temperature and actual evaporator temperature to controller 12.

Operator interface 328 allows an operator to select a desired cabin temperature, fan speed, and distribution path for conditioned cabin air. Operator interface 328 may include dials and push buttons to select air conditioning settings. In some examples, operator interface 328 may accept inputs via a touch sensitive display.

Refrigerant is supplied to evaporator 308 via evaporator valve 320 after being pumped into condenser 316. Compressor 318 receives refrigerant gas from evaporator 308 and pressurizes the refrigerant. Heat is extracted from the pressurized refrigerant so that the refrigerant is liquefied at condenser 316. The liquefied refrigerant expands after passing through evaporator valve 320 causing the temperature of evaporator 308 to be reduced.

Compressor 318 includes a clutch 324, a variable displacement control valve 322, piston 380, and swash plate 382. Piston 380 pressurizes refrigerant in air conditioning system which flows from air conditioner compressor 318 to condenser 316. Swash plate 382 adjusts the stroke of piston 380 to adjust the pressure at which refrigerant is output from air conditioner compressor 318 based on oil flow through variable displacement control valve 322. Clutch 324 may be selectively engaged and disengaged to supply air conditioner compressor 318 with rotational energy from engine 10. In one example, engine 10 supplies rotational energy to compressor 318 and wheels 160 via transmission 370. In some examples, an energy conversion device (e.g. an electric motor), such as energy conversion device 24 as depicted in FIG. 2 may also be configured to supply rotational energy to air conditioner compressor 318 and wheels 160 via transmission 370. Rotational energy may be supplied to air conditioner compressor 318 from engine 10 via belt 342. In one example, belt 342 mechanically couples shaft 340 to air conditioner compressor 318 via clutch 324. Shaft 340 may be an engine crankshaft, armature shaft, or other shaft.

One or more auxiliary refrigerant lines may be included to divert refrigerant to other system components routed to receive circulating refrigerant. For example, fuel vapor canister 22 may be configured to include coolant jacket 352. Coolant jacket 352 may be configured to receive refrigerant via auxiliary coolant line 353. In this way, canister 22 may be cooled, thereby increasing the adsorbent capacity of the adsorbent contained within canister 22. Valve 354 may be configured to control refrigerant flow through auxiliary coolant line 353 via commands from controller 12. Valve 354 may be configured as a three-way valve, such that refrigerant may bypass auxiliary coolant line 353 when valve 354 is in a first position, and may circulate through auxiliary coolant line 353 when valve 354 is in a second position. In other examples, valve 354 may be coupled within auxiliary coolant line 353, and configured to open or close based on commands from controller 12.

Figure 4:
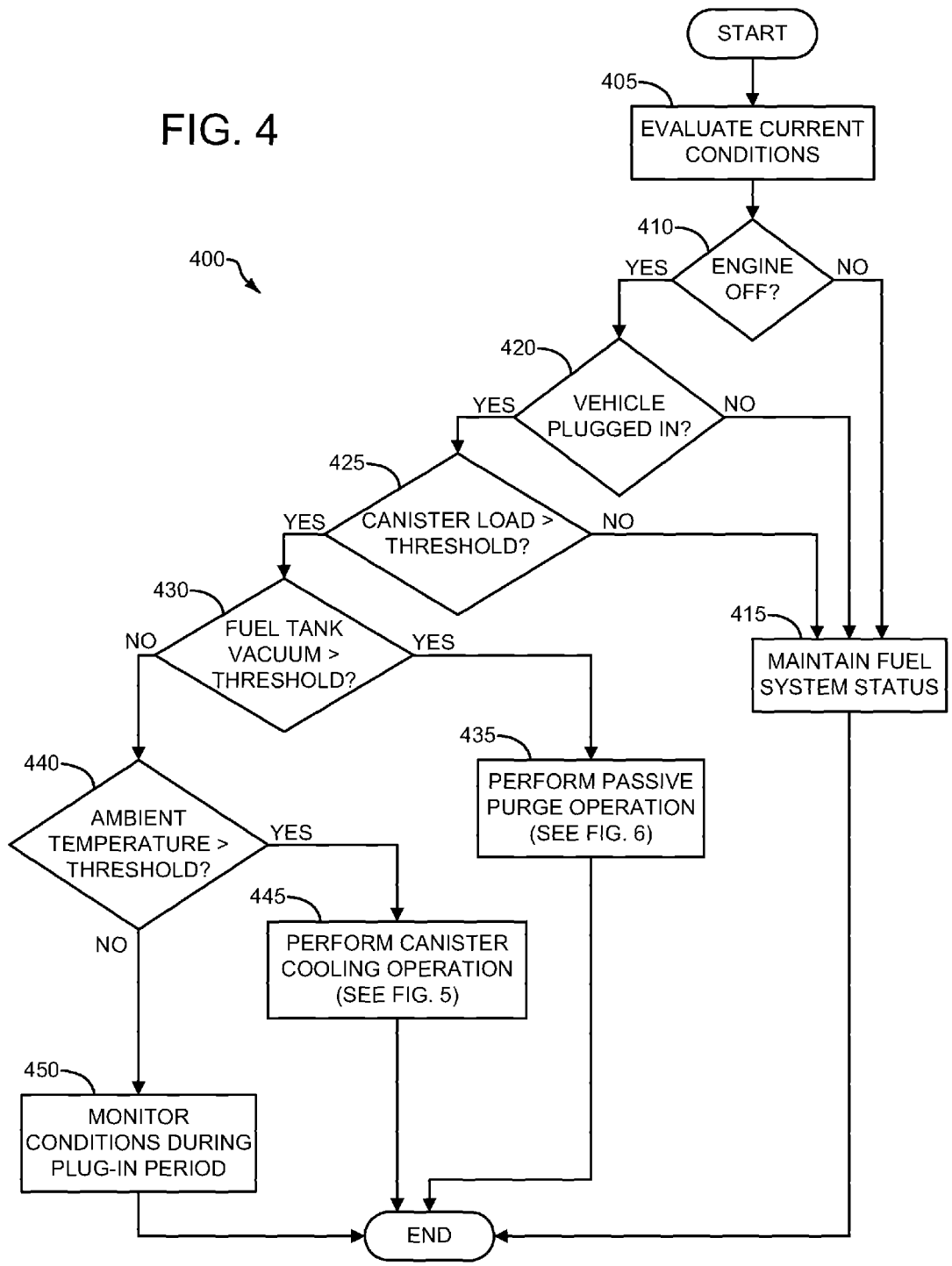
FIG. 4 shows a high-level flow chart for a method for managing bleed emissions of a fuel vapor canister of a plug-in hybrid vehicle system.

FIG. 4 depicts a flow chart for a high-level method 400 for managing bleed emissions of a fuel vapor canister in accordance with the current disclosure. In particular, method 400 describes a method for managing bleed emissions in a plug-in hybrid electric vehicle. Method 400 will be described herein with reference to the components and systems depicted in FIGS. 1-3, though it should be understood that the method may be applied to other systems without departing from the scope of this disclosure. Method 400 may be carried out by controller 12, and may be stored as executable instructions in non-transitory memory.

Method 400 may begin at 405 by evaluating the current vehicle and ambient conditions. Vehicle conditions may include the operating status of the engine, the content of the fuel vapor canister, the recent refueling history of the vehicle, the status of the battery, the engine and/or engine compartment temperature, whether the vehicle is plugged into an auxiliary power source or power grid, fuel tank pressure, etc. Vehicle conditions may be measured and/or inferred via one or more relative on-board sensors. Ambient conditions may include ambient temperature, humidity, barometric pressure, etc. as determined via on-board sensors. Evaluating vehicle and ambient conditions may further include obtaining information about the vehicle and/or the vehicle location via a GPS or other network connection.

Continuing at 410, method 400 may include determining whether the engine is off. For a hybrid vehicle system, the engine may adopt various states, including on, off, and partially on. In some examples, method 400 may not begin until the vehicle engine is turned off, or until after a key-off event. The status of the engine may be determined by controller 12. In some examples, the engine off status may further include a determination of whether the engine is expected to be turned on in the future. For example, a key-off event may signify that the engine is not expected to be turned on in the future. However, for example, if an on-board GPS has been programmed with multiple destinations, a key-off event prior to the final destination may signify that the vehicle, and potentially the engine, may be turned on again in the near future. If the engine is not off, method 400 may proceed to 415. At 415, method 400 may include maintaining the status of the vehicle's fuel system. Maintaining the status of the vehicle's fuel system may include maintaining the status of valves, pumps, etc. included in the fuel system, and/or ceding control of the fuel system to other methods or strategies currently being implemented by controller 12.

If the engine is determined to be off, method 400 may proceed to 420. At 420, method 400 may include determining whether the vehicle is plugged in. For example, method 400 may include determining whether energy storage device 26, as shown in FIG. 2, is connected to an auxiliary power source 180 via an electrical energy transmission cable 182. In some examples, where energy transmission cable is omitted or not required, method 400 may include determining whether energy storage device 26 is actively being recharged, for example, through electromagnetic resonance. In some examples, it may be possible to determine an expected recharging time period, in other words, how long the vehicle will be drawing power from the grid. The recharging time period may be based on battery state of charge, battery condition, power source voltage, battery capacity, other current draws, etc. If the vehicle is not plugged in, method 400 may proceed to 415, and may include maintaining the fuel system status as described herein.

If the engine is off and the vehicle is plugged in or otherwise recharging, method 400 may proceed to 425. At 425, method 400 may include determining whether the canister load is greater than a threshold. Canister load may be measured or inferred. For example, canister load may be determined based on recent fuel tank venting events following the most recent canister purging events. Fuel tank venting events may include monitoring the canister temperature during the event to estimate the amount of fuel tank vapors adsorbed into the canister. The canister load threshold may be predetermined, or may be based on current conditions. As described further herein, the fuel vapor canister may be managed by either cooling the fuel vapor canister, or by passively purging the fuel vapor canister. Based on current conditions, as assessed at 405, one of the fuel vapor canister management subroutines may be determined to be more likely to be executed. The canister load thresholds may thus be different for each of the subroutines. If the canister load is determined to be below a threshold (e.g. a purging operation has recently occurred, and no fuel tank venting operation has occurred since), method 400 may proceed to 415, and may include maintaining the fuel system status as described herein.

If the canister load is determined to be above a threshold, method 400 may proceed to 430. Fuel tank vacuum may be determined via a fuel tank pressure sensor, as described herein and shown in FIG. 1. The fuel tank vacuum threshold may be predetermined, or may be based on current conditions. The fuel tank vacuum threshold may be set a level sufficient to perform a passive purge operation, whereby fresh air is drawn into the fuel vapor canister via a vent using the fuel tank vacuum. If the fuel tank vacuum is above the threshold, method 400 may proceed to 435.

At 435, method 400 may include performing a passive purge operation. A detailed description of a passive purge operation in accordance with the present disclosure may be found herein and with regards to FIG. 6. Briefly, the passive purge operation may include opening an FTIV and a CVV, purging the contents of the fuel vapor canister to the fuel tank, and closing the FTIV and CVV. Method 400 may then end.

If the fuel tank vacuum is not above the threshold, method 400 may proceed to 440. At 440, method 400 may include determining whether the ambient temperature is above a threshold. The ambient temperature may be determined through an ambient temperature sensor or thermometer coupled to the exterior of the vehicle system. The ambient temperature threshold may be predetermined, or may be based on current conditions. For example, the ambient temperature threshold may be based on the fuel vapor canister content, and the properties of the fuel vapor canister adsorbent. At high ambient temperatures, (and/or high canister loads) the fuel vapor may desorb from the adsorbent and result in bleed emissions. Determining whether the ambient temperature is above a threshold may further include determining whether the ambient temperature is increasing, decreasing, or remaining stable. For example, the time of day, current forecast, etc. may be analyzed to infer the ambient temperature for the estimated time where the vehicle will be recharging, as determined at 420. If the ambient temperature is determined to be above the threshold, method 400 may proceed to 445.

At 445, method 400 may include cooling the fuel vapor canister. A detailed description of cooling a fuel vapor canister in accordance with the present disclosure may be found herein and with regards to FIG. 5. Briefly, the canister may be cooled by activating cooling fans, and/or by circulating coolant or refrigerant through a circuit coupled to the fuel vapor canister. Method 400 may then end.

If the ambient temperature is not above the threshold, method 400 may proceed to 450. At 450, method 400 may include monitoring conditions while the vehicle is coupled to a power supply. In this way, if ambient temperature increases above a threshold, or fuel tank vacuum increases above a threshold, or other conditions change that may alter the outcome of running method 400, method 400 may start over. Method 400 may then end.

Figure 5:
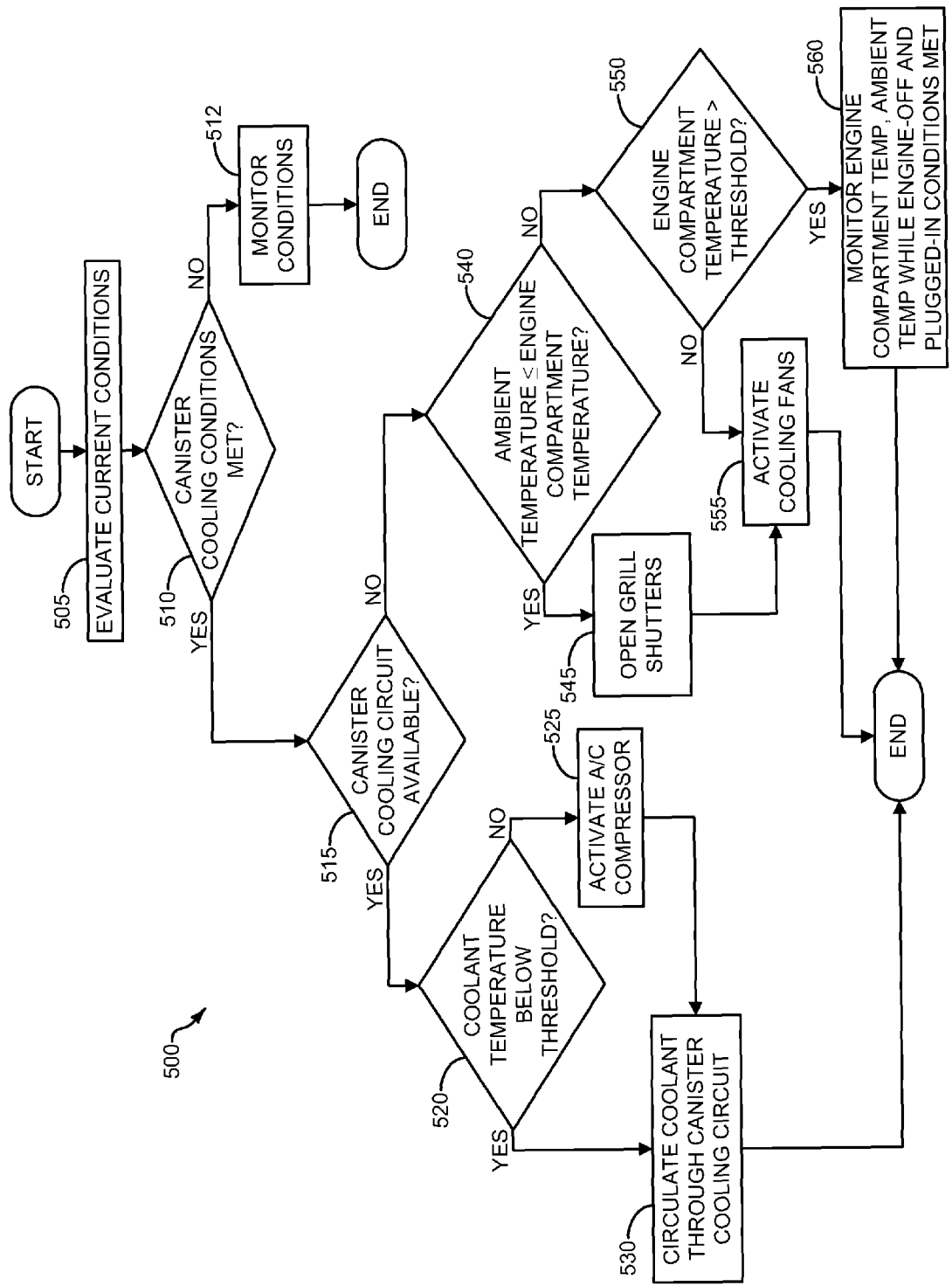
FIG. 5 shows a high-level flow chart for a method of cooling a fuel vapor canister of a plug-in hybrid vehicle system.

FIG. 5 depicts a flow chart for a high-level method 500 for cooling a fuel vapor canister in accordance with the current disclosure. In particular, method 500 describes a method for cooling a fuel vapor canister in a plug-in hybrid electric vehicle that is currently coupled to a power source. Method 500 will be described herein with reference to the components and systems depicted in FIGS. 1-3, though it should be understood that the method may be applied to other systems without departing from the scope of this disclosure. Method 500 may be carried out by controller 12, and may be stored as executable instructions in non-transitory memory. Method 500 may be executed as a subroutine for another method, such as method 400, or may be executed as a stand-alone method.

Method 500 may begin at 505 by evaluating current conditions. As described herein and with regards to FIG. 4, current conditions may include vehicle and ambient conditions. Vehicle conditions may include the operating status of the engine, the content of the fuel vapor canister, the recent refueling history of the vehicle, the status of the battery, the engine and/or engine compartment temperature, whether the vehicle is plugged into an auxiliary power source or power grid, fuel tank pressure, etc. Ambient conditions may include ambient temperature, humidity, barometric pressure, etc. as determined via on-board sensors. Evaluating vehicle and ambient conditions may further include obtaining information about the vehicle and/or the vehicle location via a GPS or other network connection.

Continuing at 510, method 500 may include determining whether conditions are met for cooling a fuel vapor canister. As described herein and with regards to FIG. 4, conditions may include an engine-off condition, a plugged-in (or otherwise recharging) condition, a canister load above a threshold, an ambient temperature above a threshold, and may include a fuel tank vacuum below a threshold. If conditions for a canister cooling operation are not met, method 500 may proceed to 512. At 512, method 500 may include monitoring vehicle and ambient conditions while the engine-off and plugged-in conditions are met. If conditions change to favor a canister cooling operation, method 500 may begin again. Otherwise, method 500 may end.

If conditions for a canister cooling operation are met, method 500 may proceed to 515. At 515, method 500 may include determining whether a canister cooling circuit is available, such as the cooling circuit depicted in FIG. 3. In other examples, a canister cooling circuit may be coupled to the engine cooling circuit, for example the cooling circuit shown in FIG. 2. If a canister cooling circuit is available, method 500 may proceed to 520. If the fuel vapor canister is not routed to include a canister cooling circuit, or the canister cooling circuit is not functional, method 500 may proceed to 540.

At 520, method 500 may include determining whether the coolant temperature in the cooling circuit is below a threshold. The coolant temperature may be determined by a sensor or thermostatic valve coupled to a coolant line. The coolant temperature threshold may be predetermined or may be based on current conditions. For example, the threshold may be set at the ambient temperature, or the engine compartment temperature. If the coolant temperature is below the threshold, it may impart a cooling effect on the fuel vapor canister. If the coolant temperature is determined to be above the threshold, method 500 may proceed to 525.

At 525, method 500 may include activating an air conditioning compressor, such as air conditioning compressor 318 as described herein and with regard to FIG. 3. Activating the air conditioning compressor may include activating an energy conversion device (such as an electric motor) coupled to the compressor via one or more belts. In this way, the coolant (or refrigerant) within the coolant circuit may be cooled below the temperature threshold using power from the external power source or power grid.

At 530, method 500 may include circulating coolant through the canister cooling circuit. Circulating coolant through the canister coolant circuit may include opening one or more valves, such as valves 320 and 354 as described herein and depicted in FIG. 3. In some examples, a pump may be activated to circulate the coolant. In some examples, the A/C compressor may be activated to circulate the coolant. Coolant may be circulated through the canister circuit until the canister temperature drops below a threshold, or may be circulated until ambient temperature drops below a threshold. In examples where activating the A/C compressor is independent of circulating coolant, the compressor may be turned off when the coolant temperature drops below a threshold, and reactivated if the coolant temperature increases above the threshold. In some examples, coolant may be circulated until the engine-off condition and/or the plugged-in condition is not met. In other examples, if fuel tank vacuum increases above a threshold, a passive purge routine may be initiated, as described herein and with regards to FIGS. 3 and 5. Method 500 may then end.

Returning to 515, if no canister cooling circuit is available, method 500 may proceed to 540. At 540, method 500 may include determining whether the ambient temperature is less than or equal to the engine compartment temperature. Ambient temperature and engine compartment temperature may be assessed via one or more temperature sensors coupled to the exterior of the vehicle system and to the interior of the engine compartment, respectively. Additionally or alternatively, the ambient temperature may be inferred based on GPS position and/or other network accessible weather data. If the ambient temperature is less than or equal to the engine compartment temperature, method 500 may proceed to 545. At 545, method 500 may include opening, or maintaining open, grill shutters, such as grill shutters 174 as described herein and depicted in FIG. 2. In this way, ambient air may be used to cool the engine compartment.

If it is determined at 540 that the ambient temperature is greater than the engine compartment temperature, method 500 may proceed to 550. At 550, method 500 may include determining whether the engine compartment temperature is greater than a threshold. If the engine compartment temperature is not greater than a threshold, method 500 may proceed to 555. At 555, method 500 may include activating cooling fans, such as cooling fans 92 as described herein and as depicted in FIG. 2.

In this way, power from the power source coupled to the vehicle may be used to cool the fuel vapor canister, thereby increasing the adsorbent capacity of the adsorbent stored in the fuel vapor canister. In scenarios where the ambient temperature is above a threshold temperature, the fuel vapor may desorb from the canister and be emitted as bleed emissions. Cooling the canister with cooling fans may thus prevent bleed emissions. However, in scenarios where the engine compartment is above a threshold temperature, it may be advantageous to open grill shutters to circulate ambient air, rather than blowing hot air at the canister.

Returning to 550, if the engine compartment is determined to be above a threshold temperature, method 500 may proceed to 560. At 560, method 500 may include monitoring engine compartment temperature and ambient temperature while the engine-off and plugged-in (or otherwise recharging) conditions are met. As the engine temperature decreases following the engine-off event, conditions for cooling the vapor canister via the activation of cooling fans may be met. Further, if ambient temperature decreases, the engine compartment and fuel vapor canister may be cooled through the opening of grill shutters and activation of cooling fans. Method 500 may then end.

Figure 6:
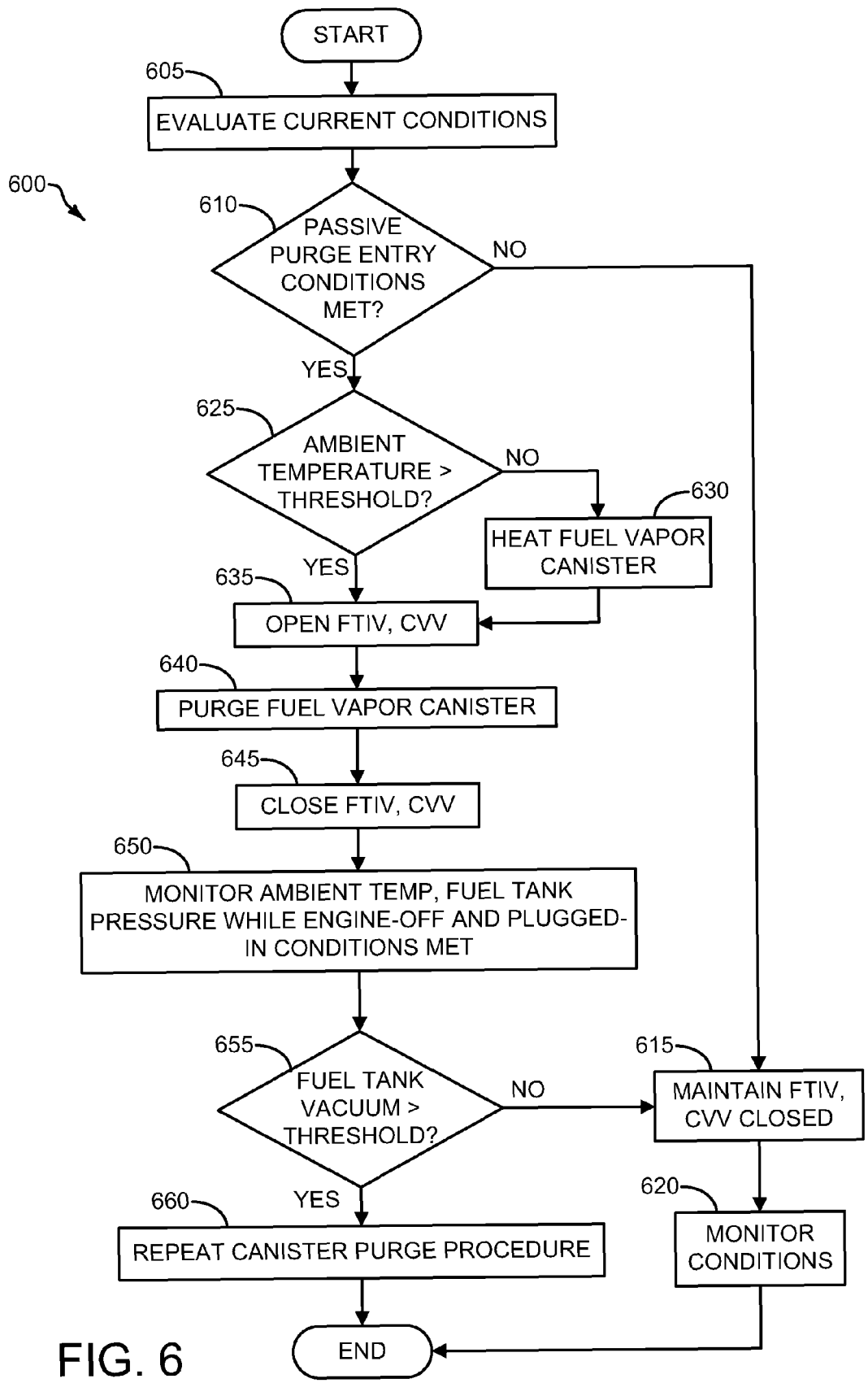
FIG. 6 shows a high-level flow chart for a method of passively purging a fuel vapor canister of a plug-in hybrid vehicle system.

FIG. 6 depicts a flow chart for a high-level method 600 for passively purging a fuel vapor canister in accordance with the current disclosure. In particular, method 600 describes a method for passively purging a fuel vapor canister in a plug-in hybrid electric vehicle that is currently coupled to a power source. Method 600 will be described herein with reference to the components and systems depicted in FIGS. 1-3, though it should be understood that the method may be applied to other systems without departing from the scope of this disclosure. Method 600 may be carried out by controller 12, and may be stored as executable instructions in non-transitory memory. Method 600 may be executed as a subroutine for another method, such as method 400, or may be executed as a stand-alone method.

Method 600 may begin at 605 by evaluating current conditions. As described herein and with regards to FIG. 4, current conditions may include vehicle and ambient conditions. Vehicle conditions may include the operating status of the engine, the content of the fuel vapor canister, the recent refueling history of the vehicle, the status of the battery, the engine and/or engine compartment temperature, whether the vehicle is plugged into an auxiliary power source or power grid, fuel tank pressure, etc. Ambient conditions may include ambient temperature, humidity, barometric pressure, etc. as determined via on-board sensors. Evaluating vehicle and ambient conditions may further include obtaining information about the vehicle and/or the vehicle location via a GPS or other network connection.

Continuing at 610, method 600 may include determining whether entry conditions are met for a passive purge operation. As described herein and with regards to FIG. 4, conditions may include an engine-off condition, a plugged-in (or otherwise recharging) condition, a canister load above a threshold, and a fuel tank vacuum above a threshold. If conditions for a canister cooling operation are not met, method 600 may proceed to 615. At 615, method 600 may include maintaining the FTIV and CVV closed. In this way, the fuel tank remains sealed, and the fuel vapor canister remains isolated from atmosphere.

Continuing at 620, method 600 may include monitoring vehicle and ambient conditions while the engine-off and plugged-in conditions are met. If conditions change to favor a passive purge operation, method 600 may begin again. For example, ambient temperature may decrease, resulting in fuel vapors in the fuel tank condensing, and further resulting in a fuel tank vacuum increasing above a threshold. Otherwise, method 600 may end.

Returning to 610, if entry conditions are met for a passive purge operation, method 600 may proceed to 625. At 625, method 600 may include determining whether the ambient temperature is above a threshold. The ambient temperature may be assessed via one or more temperature sensors coupled to the exterior of the vehicle system. The threshold may be predetermined, or may be based on current conditions, such as fuel vapor canister load and fuel tank vacuum level. In some examples, the canister temperature may be directly assessed via a canister temperature sensor, such as temperature sensor 130 as described herein and with regards to FIG. 2. In some embodiments, the engine compartment temperature may be assessed, as described herein and with regards to FIG. 5. By assessing the ambient temperature, controller 12 may determine whether the current fuel tank vacuum is sufficient to purge fuel vapors currently adsorbed within the fuel vapor canister.

If the ambient temperature is not above a threshold, method 600 may proceed to 630. At 630, method 600 may include heating the fuel vapor canister. Heating the fuel vapor canister may include activating a canister heating element, such as heating element 131. In this way, fuel vapor may be desorbed from the adsorbent stored within the canister, in preparation for a passive purge operation. The fuel vapor canister may be heated until the fuel vapor canister reaches a threshold temperature. The threshold temperature may be predetermined, or may be based on current conditions, such as fuel vapor load and fuel tank vacuum level.

When the ambient temperature or fuel vapor canister temperature is above a respective threshold, method 600 may proceed to 635. At 635, method 600 may include opening the FTIV and may further include opening the CVV. In this way, the fuel tank vacuum may be applied to the fuel vapor canister, resulting in fresh air being drawn on the canister. The fresh air may then carry fuel vapor from the heated fuel vapor canister into the fuel tank. Continuing at 640, method 600 may include purging the fuel vapor canister. Purging the fuel vapor canister may include maintaining the FTIV and CVV open until the fuel vapor canister load decreases below a threshold, until the fuel tank pressure has reached atmospheric pressure, and/or until the fuel vapor canister temperature plateaus. In this way, fuel vapor may be efficiently purged from the canister using fuel tank vacuum and a canister heating element operated via power from an external power source.

Continuing at 645, following the fuel vapor canister purge, method 600 may include closing the FTIV and CVV. In this way, the desorbed fuel vapors may be sealed into the tank, and any remaining fuel vapors in the fuel vapor canister may be isolated from atmosphere.

Continuing at 650, method 600 may include monitoring the ambient temperature and fuel tank pressure while the engine-off and plugged-in (or otherwise recharging) conditions are met. Depending on the time of day and the length of the recharging period, the ambient temperature may decrease while the vehicle is recharging, allowing for fuel tank vacuum to regenerate one or more times during a diurnal cycle.

Continuing at 655, method 600 may include determining whether the fuel tank vacuum has increased above a threshold. The threshold may be predetermined, or may be based on current conditions, such as canister load and ambient temperature. The fuel tank vacuum threshold may be the same threshold as used for the passive purge entry conditions (discussed with regards to 610 and discussed in further detail with regards to FIG. 4), or may be greater or less than the previously used threshold. For example, depending on the amount of fuel vapor purged to the tank during the initial purge routine, a greater fuel tank vacuum may be required to desorb a significant amount of residual fuel vapors. If the fuel tank vacuum is not above the threshold, method 600 may proceed to 615. At 615, method 600 may include maintaining the FTIV and CVV closed. Continuing at 620, method 600 may include monitoring vehicle and ambient conditions while the engine-off and plugged-in conditions are met. Method 600 may then end.

If fuel tank vacuum is determined to be above a threshold method 600 may proceed to 660. At 660, method 600 may include repeating the canister purge procedure. As described herein, the canister purge procedure may include heating the fuel vapor canister based on an ambient temperature, opening an FTIV and a CVV, maintaining the FTIV and CVV open during a purge operation, and closing the FTIV and CVV following the purge operation. The purge operation may further include monitoring the ambient temperature and fuel tank vacuum while the engine-off and plugged-in conditions are met, and may further include repeating the purge procedure if the fuel tank vacuum exceeds a threshold. Method 600 may then end.

The systems described herein and with regards to FIGS. 1-3, along with the methods described herein and depicted in FIGS. 4 and 6 may enable one or more systems and methods. In one example, a method for a plug-in hybrid electric vehicle, comprising: during a first condition, including an engine-off condition and the plug-in hybrid electric vehicle coupled to an external power source; heating a fuel vapor canister based on a fuel tank vacuum; and opening a fuel tank isolation valve to draw heated vapors into a fuel tank. The method may further comprise: opening a canister vent valve to draw atmospheric air into the fuel vapor canister. The first condition may further include a fuel vapor canister load above a threshold, and may further include an ambient temperature less than a threshold. The method may further comprise: closing the fuel tank isolation valve and canister vent valve when a fuel tank pressure reaches atmospheric pressure. In some embodiments, the method may further comprise: maintaining the fuel tank isolation valve and canister vent valve closed during the engine-off condition and while the plug-in hybrid electric vehicle is coupled to the external power source; during a second condition, following the first condition, the second condition including a fuel tank vacuum above a threshold; heating the fuel vapor canister; opening the fuel tank isolation valve; and opening the canister vent valve. The method may further comprise: closing the fuel tank isolation valve and canister vent valve when a fuel tank pressure reaches atmospheric pressure. Heating a fuel vapor canister may include operating a heating element coupled to the fuel vapor canister utilizing power from the external power source. In some examples, the method may further comprise: during a third condition, including an engine-off condition, the plug-in hybrid electric vehicle coupled to an external power source, a canister load above a threshold, and an ambient temperature above a threshold; opening a fuel tank isolation valve to draw vapors into a fuel tank without heating the fuel vapor canister. The technical result of implementing this method is a decrease in vehicle emissions without a corresponding decrease in fuel economy. PHEVs may have limited engine run time. The method allows for passive purge operations to be executed without forcing the engine on in order to purge fuel vapor from the canister.

In another example, a system for a plug-in hybrid electric vehicle, comprising: a fuel vapor canister coupled to a fuel tank via a fuel tank isolation valve and further coupled to atmosphere via a canister vent valve; a fuel tank pressure sensor coupled to the fuel tank; a heating element coupled to the fuel vapor canister; and a control system including executable instructions stored in non-transitory memory for: during a first condition, including an engine-off condition and the plug-in hybrid electric vehicle coupled to an external power source; heating the fuel vapor canister based on a fuel tank vacuum; opening the canister vent valve to draw atmosphere into the fuel vapor canister; and opening a fuel tank isolation valve to draw heated vapors into a fuel tank. The first condition may further include a fuel vapor canister load above a threshold, and may further include an ambient temperature less than a threshold. The control system may further include executable instructions stored in non-transitory memory for: closing the fuel tank isolation valve and canister vent valve when a fuel tank pressure reaches atmospheric pressure. In some embodiments, the control system may further include executable instructions stored in non-transitory memory for: maintaining the fuel tank isolation valve and canister vent valve closed during the engine-off condition and while the plug-in hybrid electric vehicle is coupled to the external power source; during a second condition, following the first condition, the second condition including a fuel tank vacuum above a threshold; heating the fuel vapor canister; then opening the canister vent valve; then opening the fuel tank isolation valve. The control system may further include executable instructions stored in non-transitory memory for: closing the fuel tank isolation valve and canister vent valve when a fuel tank pressure reaches atmospheric pressure. Heating a fuel vapor canister may include operating a heating element coupled to the fuel vapor canister utilizing power from the external power source. The control system may further include executable instructions stored in non-transitory memory for: during a third condition, including an engine-off condition, the plug-in hybrid electric vehicle coupled to an external power source, a canister load above a threshold, and an ambient temperature above a threshold; opening a fuel tank isolation valve to draw vapors into a fuel tank without heating the fuel vapor canister. The technical result of implementing this system is a decrease in diurnal emissions. By cleaning the fuel canister of fuel vapor, there may be decreased risk of hydrocarbons bleeding out of the canister and into the atmosphere as ambient temperature decreases. Further, depending on when during the diurnal cycle the vehicle is parked, a decrease in temperature (e.g. as temperature drops overnight) may allow for multiple purge operations to be executed as fuel tank vacuum continues to develop.

In yet another example, a method for a plug-in hybrid electric vehicle, comprising: during a first condition, including an engine-off condition, the plug-in hybrid electric vehicle coupled to an external power source, a fuel vapor canister load above a threshold, a fuel tank vacuum above a threshold, and a first ambient temperature below a threshold; heating a fuel vapor canister using power from the external power source; then opening a canister vent valve; then opening a fuel tank isolation valve. The method may further comprise: closing the fuel tank isolation valve and canister vent valve when a fuel tank pressure reaches atmospheric pressure; and maintaining the fuel tank isolation valve and canister vent valve closed during the engine-off condition and while the plug-in hybrid electric vehicle is coupled to an external power source. The method may further comprise: during a second condition, following the first condition, the second condition including an engine-off condition, the plug-in hybrid electric vehicle coupled to an external power source, a second ambient temperature lower than the first ambient temperature, and a fuel tank vacuum above a threshold; heating the fuel vapor canister using power from the external power source; then opening the canister vent valve, then opening the fuel tank isolation valve. The technical result of implementing this method is an effective method of managing canister load without increasing the load on the PHEV battery. The external power source (e.g. a power grid) may be used to heat the fuel vapor canister in preparation for a passive purge operation. This increases the effectiveness of the passive purge operation without draining the PHEV battery.

FIG. 7 shows an example timeline 700 for managing bleed emissions in a PHEV using the methods described herein and with regard to FIGS. 4 and 5. Timeline 700 includes plot 710 indicating the status of an engine over time. Timeline 700 also includes plot 720 indicating whether the vehicle is plugged in over time. Timeline 700 also includes plot 730, indicating a fuel vapor canister load over time, plot 740, indicating fuel tank pressure over time, plot 750, indicating ambient temperature over time, plot 760, indicating engine compartment temperature over time, plot 770, indicating FTIV status over time, plot 780 indicating grill shutter status over time, and plot 790 indicating cooling fan status over time. Line 735 represents a canister load threshold. Line 745 represents a fuel tank vacuum threshold. Line 755 represents an ambient temperature threshold.

From time $t_0$ to time $t_1$, the PHEV engine is on, as shown by plot 710. The vehicle is not plugged in, as shown by plot 720, and the canister load is below a threshold, as shown by plot 730. As such, entry conditions for a canister cooling operation are not met. At time $t_1$, the engine is shut off in preparation for a refueling event. The refueling event extends from time $t_1$ to time $t_2$. During the refueling event, the FTIV is opened, as shown by plot 770. This allows fuel vapor to be vented from the fuel tank to the fuel vapor canister. Accordingly, fuel tank pressure decreases from a positive pressure to atmospheric pressure, as shown by plot 740. Additionally, the fuel canister load increases above a threshold, as shown by plot 730.

At time $t_3$, the refueling event ends, and the FTIV is closed, as shown by plot 770. At time $t_4$, the vehicle is plugged in for recharging, as shown by plot 720. However, as the engine was not turned on between $t_3$ and $t_4$, the fuel vapor canister could not be purged to intake, leaving the canister load above a threshold, as shown by plot 730. Additionally, the fuel tank pressure is near atmospheric pressure. As such, there is not sufficient fuel tank vacuum to perform a passive canister purge operation. Ambient temperature is above a threshold, as shown by plot 750. As such, the conditions for a canister cooling operation are met.

In this example, no canister cooling circuit is available. At time t4, the engine compartment temperature is greater than or equal to the ambient temperature. In accordance with method 500 as described herein, this condition results in the opening of grill shutters at time $t_5$, as shown by plot 780. Engine cooling fans are then activated, as shown by plot 790. This results in the cooling of the engine compartment from time $t_5$ to time $t_6$ as shown by plot 760. At time $t_6$, the engine compartment temperature is approximately equal to the ambient temperature. Although the canister load does not change, as shown by plot 730, the activation of engine cooling fans allows the canister adsorbent to bind fuel vapor despite the high ambient temperature, thereby reducing potential bleed emissions until the canister can be purged.

FIG. 8 shows an example timeline 800 for managing bleed emissions in a PHEV using the methods described herein and with regards to FIGS. 4 and 6. Timeline 800 includes plot 810 indicating the status of an engine over time. Timeline 800 also includes plot 820 indicating whether the vehicle is plugged in over time. Timeline 800 also includes plot 830, indicating a fuel vapor canister load over time, plot 840, indicating fuel tank pressure over time, plot 850, indicating ambient temperature over time, plot 860, indicating FTIV status over time, plot 870, indicating CVV status over time, and plot 880, indicating the status of a canister heating element over time. Line 835 represents a canister load threshold. Line 845 represents a fuel tank vacuum threshold. Line 855 represents an ambient temperature threshold.

At time $t_0$, the PHEV engine is on, as shown by plot 810. The vehicle is not plugged in, as shown by plot 820, and the canister load is below a threshold, as shown by plot 830. As such, conditions for a passive purge operation are not met. From time $t_1$ to time $t_2$, the fuel tank undergoes a venting operation. The FTIV is opened, as shown by plot 860. The CVV is also open, as shown by plot 870. Accordingly, the fuel tank pressure is reduced from a positive pressure to atmospheric pressure, as shown by plot 840, and the canister load increases above a threshold, as shown by plot 830. At time $t_3$, the PHEV engine is shut off, leaving the canister load above the threshold depicted by line 835. The CVV is thus closed, as shown by plot 870. With the engine turned off, the fuel tank begins to cool at time $t_3$, and develops a vacuum as shown by plot 840.

At time $t_4$, the vehicle is plugged into to an external power source for recharging. The fuel tank continues to cool and develop a vacuum, as shown by plot 840. At $t_5$, the fuel tank pressure reaches a vacuum threshold (shown by line 845). As the engine is off, the vehicle is plugged in, and the canister load is above a threshold, conditions are thus met for a passive purge operation. Ambient temperature is below a threshold, as shown by plot 850. As such, a canister heating element is turned on, as shown by plot 880. At time $t_6$, the FTIV and CVV are opened, as shown by plots 860 and 870. This allows the tank vacuum to draw atmospheric air on the fuel vapor canister, purging some of the canister contents to the fuel tank. Accordingly, the canister load decreases, as shown by plot 830, and the fuel tank pressure returns to atmospheric pressure, as shown by plot 840. At time $t_7$, the FTIV and CVV are closed, ending the passive purge operation.

From time $t_7$ to time $t_8$, the ambient temperature is decreasing, as shown by plot 850. As the fuel tank remains sealed, a fuel tank vacuum will develop, as shown by plot 840. At time t8, the fuel tank pressure reaches a vacuum threshold (shown by line 845). As the engine is off, the vehicle is plugged in, and the canister load is above a threshold, conditions are thus met for a passive purge operation. Ambient temperature is below a threshold, as shown by plot 850. As such, a canister heating element is turned on, as shown by plot 880. At time $t_9$, the FTIV and CVV are opened, as shown by plots 860 and 870. This allows the tank vacuum to draw atmospheric air on the fuel vapor canister, purging some of the canister contents to the fuel tank. Accordingly, the canister load decreases, as shown by plot 830, and the fuel tank pressure returns to atmospheric pressure, as shown by plot 840. At time $t_{10}$, the FTIV and CVV are closed, ending the passive purge operation.

Managing the temperature of a fuel vapor canister is not limited to scenarios in which a PHEV is plugged in to an auxiliary power source during an engine-off condition. FIG. 9 shows a high-level method 900 for managing the temperature of a fuel vapor canister in anticipation of a refueling event. Method 900 will be described herein with reference to the components and systems depicted in FIGS. 1-3, though it should be understood that the method may be applied to other systems without departing from the scope of this disclosure. Method 900 may be carried out by controller 12, and may be stored as executable instructions in non-transitory memory.

Method 900 may begin at 905 by evaluating the current vehicle and ambient conditions. Vehicle conditions may include the operating status of the engine, the content of the fuel vapor canister, the recent refueling history of the vehicle, the status of the battery, the fill level of the fuel tank, the engine and/or engine compartment temperature, whether the vehicle is plugged into an auxiliary power source or power grid, fuel tank pressure, etc. Vehicle conditions may be measured and/or inferred via one or more relative on-board sensors. Ambient conditions may include ambient temperature, humidity, barometric pressure, etc. as determined via on-board sensors. Evaluating vehicle and ambient conditions may further include obtaining information about the vehicle and/or the vehicle location via a GPS or other network connection, and may further include determining whether a direct refueling request has been received (e.g. a refuel pushbutton has been pressed, and/or a refueling door has been opened).

Continuing at 910, method 900 may include determining the likelihood of an imminent refueling event based on the conditions evaluated at 905. Determining the likelihood of an imminent refueling event may include executing a refueling prediction algorithm. The likelihood of an imminent refueling event may be based on a number of factors, including, but not limited to, fuel level, vehicle location (e.g. as determined via GPS), battery state of charge, and/or status of a direct refueling request. For example, if fuel level is below a threshold, and the vehicle location is determined to be at or approaching a refueling station, and the battery state of charge is below a threshold, it may be determined that a refueling event is imminent. In another example, the receiving of a direct refueling request (for example, via a refuel pushbutton), would indicate a refueling event is imminent, even if fuel level is above a threshold.

Continuing at 915, method 900 may include determining whether a refueling likelihood is above a threshold. If the refueling likelihood is not above a threshold, method 900 may proceed to 917. At 917, method 900 may include maintaining the evaporative emissions system conditions. Method 900 may then end. If the refueling likelihood is above the threshold, method 900 may proceed to 920.

At 920, method 900 may include determining a desired canister temperature. The desired canister temperature may be based on the current canister load, and further based on an amount of fuel vapor anticipated during the refueling event. The anticipated fuel vapor amount may be based on fuel tank pressure, fuel tank fill level, fuel volatility, ambient temperature, ambient pressure, etc. A higher amount of anticipated fuel vapor may indicate a lower desired canister temperature, in order to maximize fuel vapor adsorbancy while minimizing the system resources dedicated to cooling the canister.

Continuing at 925, method 900 may include determining whether the current canister temperature is greater than the desired canister temperature. Canister temperature may be determined via a canister temperature sensor, such as temperature sensor 130 as described herein and depicted in FIG. 1. If the current canister temperature is not greater than the desired canister temperature, method 900 may proceed to 917. At 917, method 900 may include maintaining the current evaporative emissions system conditions.

If the current canister temperature is greater than the desired canister temperature, method 900 may proceed to 930. At 930, method 900 may include cooling the canister to the desired canister temperature. As described herein and with regards to FIG. 5, the fuel vapor canister may be cooled via a canister cooling circuit if available, and/or may be cooled by activating cooling fans. When the canister temperature reaches the desired canister temperature, method 900 may end.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a plug-in hybrid electric vehicle, comprising:
during a first condition, including an engine-off condition and the plug-in hybrid electric vehicle coupled to an external power source;
heating a fuel vapor canister based on a fuel tank vacuum; and
opening a fuel tank isolation valve to draw heated vapors into a fuel tank.

2. The method of claim 1, further comprising:
opening a canister vent valve to draw atmospheric air into the fuel vapor canister.

3. The method of claim 1, where the first condition further includes a fuel vapor canister load above a threshold.

4. The method of claim 1, where the first condition further includes an ambient temperature less than a threshold.

5. The method of claim 2, further comprising:
closing the fuel tank isolation valve and canister vent valve when a fuel tank pressure reaches atmospheric pressure.

6. The method of claim 5, further comprising:
maintaining the fuel tank isolation valve and canister vent valve closed during the engine-off condition and while the plug-in hybrid electric vehicle is coupled to the external power source;
during a second condition, following the first condition, the second condition including a fuel tank vacuum above a threshold;
heating the fuel vapor canister;
opening the fuel tank isolation valve; and
opening the canister vent valve.

7. The method of claim 5, further comprising:
closing the fuel tank isolation valve and canister vent valve when a fuel tank pressure reaches atmospheric pressure.

8. The method of claim 1, where heating a fuel vapor canister includes operating a heating element coupled to the fuel vapor canister utilizing power from the external power source.

9. The method of claim 4, further comprising:
during a third condition, including an engine-off condition, the plug-in hybrid electric vehicle coupled to an external power source, a canister load above a threshold, and an ambient temperature above a threshold;
opening a fuel tank isolation valve to draw vapors into a fuel tank without heating the fuel vapor canister.

10. A system for a plug-in hybrid electric vehicle, comprising:
a fuel vapor canister coupled to a fuel tank via a fuel tank isolation valve and further coupled to atmosphere via a canister vent valve;
a fuel tank pressure sensor coupled to the fuel tank;
a heating element coupled to the fuel vapor canister; and
a control system including executable instructions stored in non-transitory memory for:
during a first condition, including an engine-off condition and the plug-in hybrid electric vehicle coupled to an external power source;
heating the fuel vapor canister based on a fuel tank vacuum;
opening the canister vent valve to draw atmosphere into the fuel vapor canister; and
opening a fuel tank isolation valve to draw heated vapors into a fuel tank.

11. The system of claim 10, where the first condition further includes a fuel vapor canister load above a threshold.

12. The system of claim 10, where the first condition further includes an ambient temperature less than a threshold.

13. The system of claim 10, where the control system further includes executable instructions stored in non-transitory memory for:
closing the fuel tank isolation valve and canister vent valve when a fuel tank pressure reaches atmospheric pressure.

14. The system of claim 13, where the control system further includes executable instructions stored in non-transitory memory for:
maintaining the fuel tank isolation valve and canister vent valve closed during the engine-off condition and while the plug-in hybrid electric vehicle is coupled to the external power source;
during a second condition, following the first condition, the second condition including a fuel tank vacuum above a threshold;
heating the fuel vapor canister; then
opening the canister vent valve; then
opening the fuel tank isolation valve.

15. The system of claim 14, where the control system further includes executable instructions stored in non-transitory memory for:
closing the fuel tank isolation valve and canister vent valve when a fuel tank pressure reaches atmospheric pressure.

16. The system of claim 10, where heating a fuel vapor canister includes operating a heating element coupled to the fuel vapor canister utilizing power from the external power source.

17. The system of claim 12, where the control system further includes executable instructions stored in non-transitory memory for:
during a third condition, including an engine-off condition, the plug-in hybrid electric vehicle coupled to an external power source, a canister load above a threshold, and an ambient temperature above a threshold;
opening a fuel tank isolation valve to draw vapors into a fuel tank without heating the fuel vapor canister.

18. A method for a plug-in hybrid electric vehicle, comprising:
during a first condition, including an engine-off condition, the plug-in hybrid electric vehicle coupled to an external power source, a fuel vapor canister load above a threshold, a fuel tank vacuum above a threshold, and a first ambient temperature below a threshold;
heating a fuel vapor canister using power from the external power source; then
opening a canister vent valve; then
opening a fuel tank isolation valve.

19. The method of claim 18, further comprising:
closing the fuel tank isolation valve and canister vent valve when a fuel tank pressure reaches atmospheric pressure; and
maintaining the fuel tank isolation valve and canister vent valve closed during the engine-off condition and while the plug-in hybrid electric vehicle is coupled to an external power source.

20. The method of claim 19, further comprising:
during a second condition, following the first condition, the second condition including an engine-off condition, the plug-in hybrid electric vehicle coupled to an external power source, a second ambient temperature lower than the first ambient temperature, and a fuel tank vacuum above a threshold;
heating the fuel vapor canister using power from the external power source; then
opening the canister vent valve, then
opening the fuel tank isolation valve.

* * * * *